United States Patent
Asplund et al.

(10) Patent No.: US 8,717,786 B2
(45) Date of Patent: May 6, 2014

(54) PLANT FOR TRANSMITTING ELECTRIC POWER UTILIZING ASYMMETRIC OPERATION OF VOLTAGE SOURCE CONVERTERS

(75) Inventors: Gunnar Asplund, Solna (SE); Björn Jacobson, Grängesberg (SE)

(73) Assignee: ABB Technology AG, Zurich (CH)

( * ) Notice: Subject to any disclaimer, the term of this patent is extended or adjusted under 35 U.S.C. 154(b) by 420 days.

(21) Appl. No.: 12/997,187

(22) PCT Filed: Jun. 9, 2008

(86) PCT No.: PCT/EP2008/057153
§ 371 (c)(1),
(2), (4) Date: Jan. 13, 2011

(87) PCT Pub. No.: WO2009/149742
PCT Pub. Date: Dec. 17, 2009

(65) Prior Publication Data
US 2011/0096575 A1    Apr. 28, 2011

(51) Int. Cl.
*H02M 5/45* (2006.01)
(52) U.S. Cl.
USPC .......................................................... 363/37
(58) Field of Classification Search
USPC .............. 363/34–37, 81, 84, 89, 95, 97, 124, 363/125, 127, 131
See application file for complete search history.

(56) References Cited

U.S. PATENT DOCUMENTS 5,717,580 A * 2/1998 Karlecik-Maier ............ 363/35
6,936,947 B1 * 8/2005 Leijon et al. ................. 310/196
8,300,435 B2 * 10/2012 Bjorklund et al. ............ 363/35
2002/0085396 A1 * 7/2002 Halvarsson et al. .......... 363/35
2004/0084987 A1   5/2004 Leijon
2008/0205093 A1 * 8/2008 Davies et al. ................. 363/35
2009/0219737 A1   9/2009 Bjorklund et al.

FOREIGN PATENT DOCUMENTS

| CN | 1220041 A | 6/1999 |
|---|---|---|
| CN | 101258670 A | 9/2008 |
| CN | 101297469 A | 10/2008 |
| DE | 101 03 031 A1 | 7/2002 |
| EP | 0 938 102 A2 | 8/1999 |
| EP | 938102 A2 * | 8/1999 |
| WO | WO 2007/023064 A1 | 3/2007 |
| WO | WO 2007/028349 A1 | 3/2007 |

OTHER PUBLICATIONS

"Siemens liefert neue HGÜ-Technik für verlustarme Energieübertragung per Seekabel nach San Francisco", Press Release, Oct. 10, 2007, pp. 1-3.
Gilje et al., "Valhall Re-Development Project, Power From Shore", Energex 2006, 11th International Energy Conference & Exhibition, Jun. 12, 2006.
Harvey et al. "The Moyle HVDC Interconnnector Project Considerations, Design and Implementation", 7th International Conference on AC-DC Power Transmission, Nov. 28, 2001, pp. 145-149.

* cited by examiner

*Primary Examiner* — Matthew Nguyen
*Assistant Examiner* — Jeffrey Gblende
(74) *Attorney, Agent, or Firm* — Birch, Stewart, Kolasch & Birch, LLP

(57) ABSTRACT

A plant for transmitting electric power through HVDC includes two converter stations interconnected by a bipolar direct voltage network and each connected to an alternating voltage network. Each converter station has a Voltage Source Converter with switching cells each including at least one energy storing capacitor. The Voltage Source Converters are configured to utilize a direct voltage having a higher magnitude for a first of the poles than for a second thereof with respect to ground.

11 Claims, 3 Drawing Sheets

US 8,717,786 B2

PLANT FOR TRANSMITTING ELECTRIC POWER UTILIZING ASYMMETRIC OPERATION OF VOLTAGE SOURCE CONVERTERS

TECHNICAL FIELD OF THE INVENTION AND BACKGROUND ART

The present invention relates to a plant for transmitting electric power through High Voltage Direct Current (HVDC) comprising two converter stations interconnected by a bipolar direct voltage network and each connected to an alternating voltage network for feeding electric power from one of said alternating voltage networks to the other, each converter station having a Voltage Source Converter having at least one phase leg connecting to opposite poles of the direct voltage side of the converter and comprising a series connection of switching cells, each said switching cell having on one hand at least two semiconductor assemblies connected in series and having each a semiconductor device of turn-off type and a free-wheeling diode connected in parallel therewith and on the other at least one energy storing capacitor, a phase output of the converter being configured to be connected to an alternating voltage side of the converter being formed between two switching cells along said series connection of switching cells, each said switching cell being configured to obtain two switching states by control of said semiconductor devices of each switching cell, namely a first switching state and a second switching state, in which the voltage across said at least one energy storing capacitor and a zero voltage, respectively, is applied across the terminals of the switching cell, for obtaining a determined alternating voltage on said phase output.

It is possible that one of the converter stations always functions as rectifier, i.e. electric power is fed from the alternating voltage network connected to this station and to the other converter station operating as inverter and through this to the alternating voltage network connected to the converter station last mentioned. This would be the case if the alternating voltage network connected to the converter station first mentioned is a part of a plant for generating electric power, such as a wind power park. However, it is also conceivable that the feeding of electric power between the two converter stations may change, so that the converter stations may change from an operation as rectifier to inverter and conversely.

The converters in said stations may have any number of said phase legs, but they have normally three such phase legs for having a three phase alternating voltage on the alternating voltage side thereof.

A Voltage Source Converter of this type may be used in all kinds of situations, in which direct voltage is to be converted into alternating voltage and conversely, in which examples of such uses are in stations of HVDC-plants (High Voltage Direct Current), in which direct voltage is normally converted into a three-phase alternating voltage or conversely, or in so-called back-to-back stations in which alternating voltage is firstly converted into direct voltage and this is then converted into alternating voltage, as well as in SVCs (Static Var Compensator), in which the direct voltage side consists of capacitors hanging freely.

A Voltage Source Converter of this type is known through for example DE 101 03 031 A1 and WO 2007/023064 A1 and is as disclosed there normally called a multi-cell converter or M2LC. Reference is made to these publications for the functioning of a converter of this type. Said switching cells of the converter may have other appearances than those shown in said publications, and it is for instance possible that each switching cell has more than one said energy storing capacitor, as long as it is possible to control the switching cell to be switched between the two states mentioned in the introduction.

The present invention is directed to such Voltage Source Converters configured to transmit high powers. When such a Voltage Source Converter is used to transmit high powers this also means that high voltages are handled, and the voltage of the direct voltage side of the converter is determined by the voltages across said energy storing capacitors of the switching cells. This means that a comparatively high number of such switching cells are to be connected in series for a high number of semiconductor devices, i.e. said semiconductor assemblies are to be connected in series in each said switching cell, and a Voltage Source Converter of this type is particularly interesting when the number of the switching cells in said phase leg is comparatively high. A high number of such switching cells connected in series means that it will be possible to control these switching cells to change between said first and second switching state and by that already at said phase output obtain an alternating voltage being very close to a sinusoidal voltage. This may be obtained already by means of substantially lower switching frequencies than typically used in known Voltage Source Converters of the type shown in FIG. 1 in DE 101 03 031 A1 having switching cells with at least one semiconductor device of turn-off type and at least one free-wheeling diode connected in anti-parallel therewith. This makes it possible to obtain substantially lower losses and also considerably reduces problems of filtering and harmonic currents and radio interferences, so that equipment therefor may be less costly.

Accordingly, a plant for transmitting electric power through HVDC having converter stations with such Voltage Source Converters of M2LC-type has a number of advantages.

SUMMARY OF THE INVENTION

The object of the present invention is to provide a plant of the type defined in the introduction being improved in at least some aspect with respect to such plants already known.

This object is according to the invention obtained by providing such a plant, in which said voltage source converters are configured to utilize a direct voltage having a higher magnitude for a first of the poles than for a second thereof with respect to ground and by that being asymmetric with respect to ground for creating said alternating voltage on said phase output of the respective converter.

By utilizing such an asymmetry on the direct voltage side of the converters cheaper cables or overhead lines may be used for said direct voltage network of the plant. Thus, the present invention resides in a combination of low loss converters of the M2LC type and cheap transmission lines in a plant for transmitting electric power through HVDC. This constitutes a remarkable improvement with respect to such plants already known.

According to an embodiment of the invention said converters are configured to utilize said direct voltage of magnitude being at least three times higher for said first pole than said voltage magnitude of said second pole. This makes it possible to utilize a less costly conductor for said second pole than for the first pole and by that to save costs.

According to another embodiment of the invention said converters are configured to utilize said direct voltage of a magnitude being at least five times higher for said first pole than said voltage magnitude of said second pole, and according to a still further embodiment of the invention said converters are configured to utilize said direct voltage of a magnitude being at least 5 to 20, preferably 5 to 10 times, higher for said first pole than said voltage magnitude of said second pole. These embodiments allow a considerable saving of costs for the transmission line constituting said direct voltage network of the plant.

According to another embodiment of the invention said converters are configured to utilize said direct voltage for said second pole of a magnitude being less than 1% of said voltage magnitude of said first pole, i.e. said second pole is at a potential close to ground. Such an asymmetric operation of the Voltage Source Converters opens up for a considerable saving of costs for the transmission line in different ways constituting further embodiments of the present invention discussed below.

According to another embodiment of the invention said bipolar direct voltage network comprises one high voltage pole conductor configured to form said first pole interconnecting the two converter stations and one low voltage pole conductor configured to form said second pole interconnecting said converter stations. Costs may be saved by utilizing a low voltage pole conductor for forming said second pole of the transmission line.

According to another embodiment of the invention said direct voltage network comprises a line forming said two poles interconnecting said two converter stations, and said line has an inner central high voltage conductor forming said first pole and an outer low voltage conductor forming said second pole surrounding said high voltage conductor and being separated therefrom by an insulating layer. Said line may be an overhead line or a cable buried in the ground or in the sea, and in the latter case the outer low voltage conductor has to be surrounded by an insulating layer. Accordingly, costs are saved by having only one line for said bipolar direct voltage network, in which current is flowing in said inner central high voltage conductor from one station to the other and then a return current is flowing in the opposite direction in the outer low voltage conductor.

According to another embodiment of the invention the cross-section area of the low voltage conductor is 1 to 2 times, preferably 1 to 1.5 times, the cross-section area of the central high voltage conductor. This is necessary, since the low voltage conductor may be manufactured of a less costly material than the high voltage conductor and has to take a current of the same level as the high voltage conductor.

According to another embodiment of the invention said bipolar direct voltage network comprises a high voltage pole conductor configured to form said first pole, and the direct voltage network is configured to utilize the ground as current return path for forming said second pole. It is also possible to utilize seawater surrounding a cable to which said high voltage conductor belongs as a current return path for forming said second pole. In both these cases only one high voltage conductor is to be used for the direct voltage network interconnecting the stations.

According to another embodiment of the invention the number of the switching cells of said phase leg of the Voltage Source Converters is ≥4, ≥12, ≥30 or ≥50. A converter of the type used in a plant according to the invention is particularly interesting when the number of switching cells of a said phase leg is rather high resulting in a high number of possible levels of the voltage pulses delivered on said phase output.

According to another embodiment of the invention said semiconductor device of the switching cell assemblies are IGBTs (Insulated Gate Bipolar Transistor), IGCTs (Integrated Gate Commutated Thyristor) or GTOs (Gate Turn-Off Thyristor). These are suitable semiconductor devices for such converters, although other semiconductor devices of turn-off type are also conceivable.

According to another embodiment of the invention said Voltage Source Converters of the plant are configured to have a direct voltage across said two poles being between 1 kV and 1200 kV or between 10 kV and 1200 kV or between 100 kV and 1200 kV. The invention is the more interesting the higher said direct voltage is.

According to another embodiment of the invention the plant is configured to conduct a direct current of 200 A to 10 kA, or 1 kA to 7 kA, through said direct voltage network from one converter station to the other. These are currents suitable and possible to be handled by a plant according to the present invention.

Further advantages as well as advantageous features of the invention will appear from the following description.

BRIEF DESCRIPTION OF THE DRAWINGS

With reference to the appended drawings, below follows a description of embodiments of the invention cited as examples.

In the drawings.

DETAILED DESCRIPTION OF EMBODIMENTS OF THE INVENTION

Figure 1:
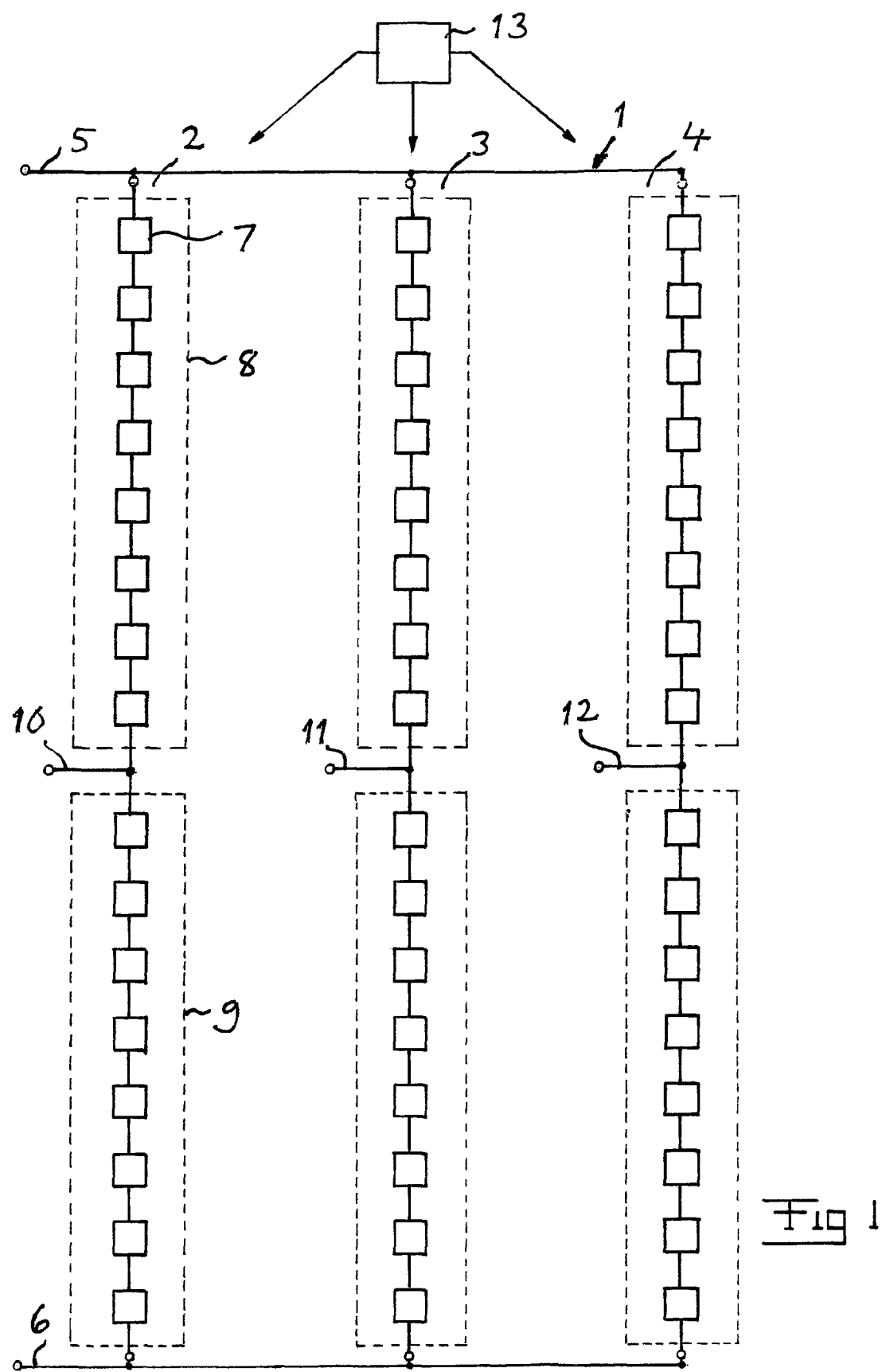
FIG. 1 is a very simplified view of a Voltage Source Converter of the type used in a plant according to the present invention.

FIG. 1 illustrates very schematically the general construction of a Voltage Source Converter 1 of the type used in a HVDC plant according to the present invention. This converter has three phase legs 2-4 connected to opposite poles 5, 6 of a direct voltage side of the converter, i.e. a direct voltage network for transmitting high voltage direct current. Each phase leg comprises a series connection of switching cells 7 indicated by boxes, in the present case 16 to the number, and this series connection is divided into two equal parts, an upper valve branch 8 and a lower valve branch 9, separated by a point 10-12 forming a phase output being configured to be connected to an alternating voltage side of the converter. The phase outputs 10-12 may possibly through a transformer connect to a three phase alternating voltage network, load, etc. Filtering equipment is also arranged on said alternating voltage side for improving the shape of the alternating voltage on said alternating voltage side.

A control arrangement 13 is arranged for controlling the switching cells 7 and by that the converter to convert direct voltage into alternating voltage and conversely.

Figure 2:
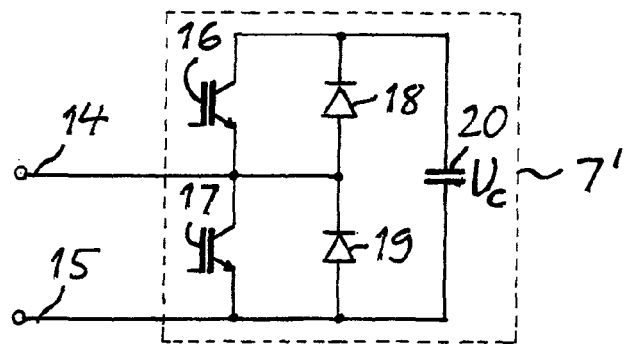
FIGS. 2 and 3 illustrate two different known switching cells, which may be a part of a Voltage Source Converter in a plant according to the present invention.
Figure 3:
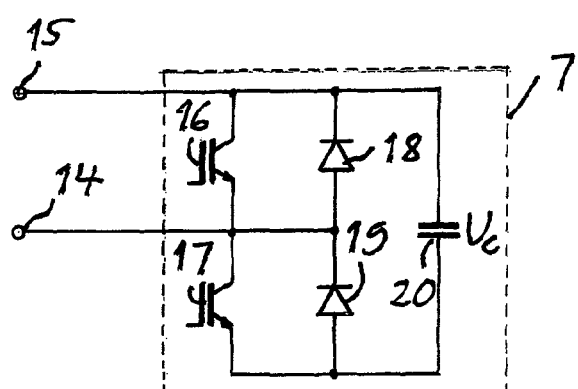

The Voltage Source Converter has switching cells 7 of the type having on one hand at least two semiconductor assemblies with each a semiconductor device of turn-off type, and a free-wheeling diode connected in parallel therewith and on the other at least one energy storing capacitor, and two examples 7, 7' of such switching cells are shown in FIG. 2 and FIG. 3. The terminals 14, 15 of the switching cells are adapted to be connected to adjacent switching cells in the series connection of switching cells forming a phase leg. The semiconductor devices 16, 17 are in this case IGBTs connected in parallel with diodes 18, 19. Although only one semiconductor device and one diode is shown per assembly these may stand for a number of semiconductor devices and diodes, respectively, connected in parallel for sharing the current flowing through the assembly. An energy storing capacitor 20 is connected in parallel with the respective series connection of the diodes and the semiconductor devices. One terminal 14 is connected to the mid point between the two semiconductor devices as well as the mid point between the two diodes. The other terminal 15 is connected to the energy storing capacitor 20, in the embodiment of FIG. 2 to one side thereof and in the embodiment according to FIG. 3 to the other side thereof. It is pointed out that each semiconductor device and each diode as shown in FIG. 2 and FIG. 3 may be more than one connected in series for being able to handle the voltages to be handled, and the semiconductor devices so connected in series may then be controlled simultaneously so as to act as one single semiconductor device.

The switching cells shown in FIG. 2 and FIG. 3 may be controlled to obtain one of a) a first switching state and b) a second switching state, in which for a) the voltage across the capacitor 20 and for b) a zero voltage is applied across the terminals 14, 15. For obtaining the first state in FIG. 2 the semiconductor device 16 is turned on and the semiconductor device 17 turned off and in the embodiment according to FIG. 3 the semiconductor device 17 is turned on and the semiconductor 16 is turned off. The switching cells are switched to the second state by changing the state of the semiconductor devices, so that in the embodiment according to FIG. 2 the semiconductor device 16 is turned off and 17 turned on and in FIG. 3 the semiconductor device 17 is turned off and 16 turned on.

Figure 4:
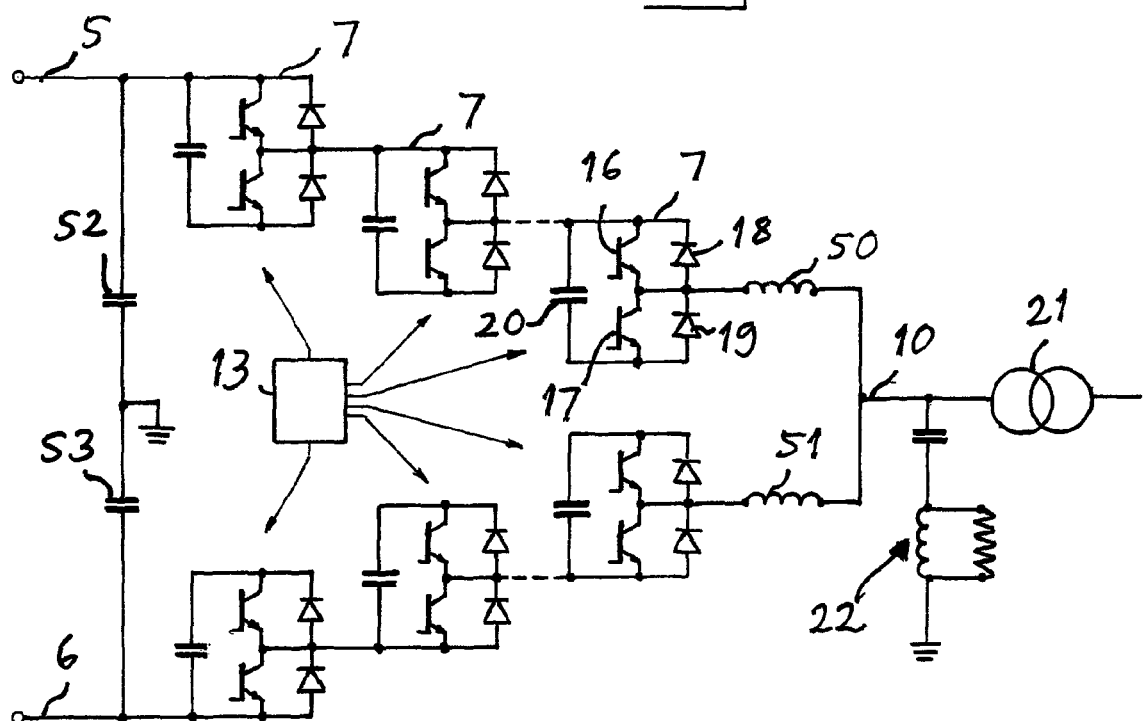
FIG. 4 is a simplified view very schematically illustrating a Voltage Source Converter in a plant according to the present invention.

FIG. 4 shows a little more in detail how the phase leg 2 of the converter according to FIG. 1 is formed by switching cells of the type shown in FIG. 3, in which totally ten switching cells have been left out for simplifying the drawing. The control arrangement 13 is adapted to control the switching cells by controlling the semiconductor devices thereof, so that they will either deliver a zero voltage or the voltage across the capacitor to be added to the voltages of the other switching cells in said series connection. A transformer 21 and filtering equipment 22 are here also indicated. It is shown how each valve branch is through a phase reactor 50, 51 connected to the phase output 10, and such phase reactors should also be there in FIG. 1 for the phase outputs 10, 11 and 12, but have there been left out for simplifying the illustration.

In a plant for transmitting electric power through High Voltage Direct Current (HVDC) according to the present invention the Voltage Source Converters of the type shown in FIG. 4 are configured to utilize a direct voltage having a higher magnitude for a first 5 of the poles then for a second 6 thereof with respect to ground and by that being asymmetric with respect to ground for creating said alternating voltage on said phase output of the respective converter. Such an asymmetry of the converter with respect to the difference of the potentials of said poles with respect to ground may be achieved in different ways. The two capacitors 52, 53 on both sides of the ground connection in the converter shown in FIG. 4 indicates that the potential of the two poles 5, 6 will be symmetrical with respect to ground or earth, but that is not the case here.

Figure 5:
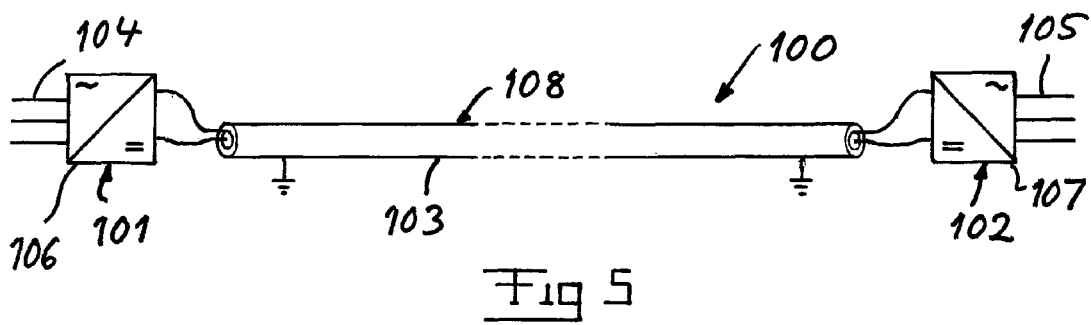
FIG. 5 is a very schematic view illustrating a plant according to a first embodiment of the invention.

FIG. 5 very schematically illustrates a plant 100 for transmitting electric power through High Voltage Direct Current comprising two converter stations 101, 102 interconnected by a bipolar direct voltage network 103 and each connected to an alternating voltage network 104, 105 for feeding electric power from one of said alternating voltage networks to the other. Each converter station has a Voltage Source Converter 106, 107 of the type described above.

Figure 6:
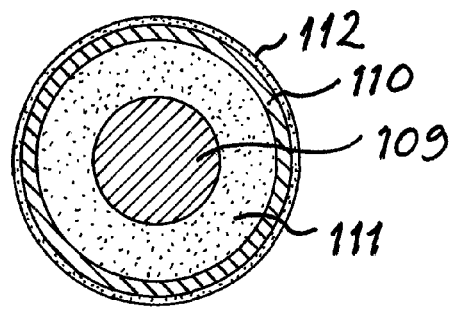
FIG. 6 is a simplified cross-section view of a cable used as direct voltage network in a plant according to FIG. 5.

The direct voltage network 103 of this plant comprises a single line 108, such as an overhead line or a cable, forming the two poles 5, 6 interconnecting the two converter stations 101, 102. The voltage source converters are configured to utilize a direct voltage having a higher amplitude for the first pole 5 than for the second pole 6 with respect to ground and by that being asymmetric with respect to ground for creating the alternating voltage on the phase output of the respective converter. Reference is now also made to FIG. 6. The first pole is in the present case formed by an inner central high voltage conductor 109, which may have a voltage of 50 kV-1000 kV with respect to ground, whereas the second pole is formed by a low voltage conductor 110 surrounding the high voltage conductor and being separated therefrom by an insulating layer 111. The low voltage conductor has a much lower voltage with respect to ground than the first voltage conductor and may preferably have a potential close to ground potential. The insulating layer 111 has to be thick enough for withstanding the voltage thereacross.

The cross-section area of the low voltage conductor 110 is 1-2 times, preferably 1-1.5 times, the cross-section area of the central high voltage conductor 109. The low voltage conductor may by this be made of a less costly material than the high voltage conductor.

It is shown in FIG. 6 how a thin further insulating layer 112 is applied around the low voltage conductor when this is a cable to be buried in the ground or in the sea.

A transmission line of the type illustrated in FIGS. 5 and 6 may be manufactured to a lower cost than bipolar symmetric transmission lines.

Figure 7:
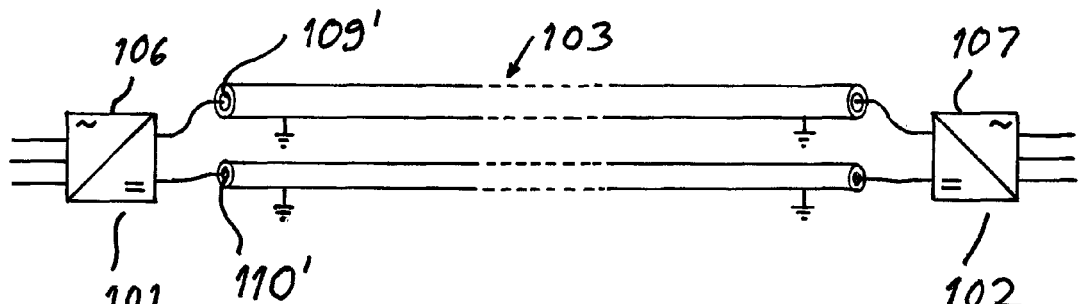
FIG. 7 is a view similar to FIG. 5 of a plant according to a second embodiment of the invention.

A plant according to a second embodiment of the present invention is schematically illustrated in FIG. 7. This plant differs from the plant shown in FIG. 5 by the fact that the bipolar direct voltage network comprises one high voltage pole conductor 109' configured to form the first pole interconnecting the two converter stations 101, 102 and a low voltage pole conductor 110' configured to form the second pole interconnecting the converter stations. Thus, the respective converter is configured to utilize a voltage of a magnitude being higher for the pole conductor 109' with respect to ground than the pole conductor 110', such as preferably at least three times higher, at least five times higher, 5-20, preferably 5-10 times higher. The potential may for instance be +125 kV for the high voltage pole conductor 109' and −25 kV for the low voltage pole conductor 110'. The low voltage conductor may by this be made to a considerably lower cost than the high voltage conductor. The conductors 109' and 110' may be surrounded by an insulation and belong to a cable, such as a PEX-cable, or they may constitute overhead lines.

The asymmetry with respect to the voltage on the direct voltage side of the converters in a plant according to the present invention also makes it possible to utilize ground or seawater as the low voltage pole for forming a return path of the current from one of the converter stations to the other.

The invention is of course not in any way restricted to the embodiments described above, but many possibilities to modifications thereof will be apparent to a person with ordinary skill in the art without departing from the scope of the invention as defined in the appended claims.

As already stated, the Voltage Source Converters in a plant according to the present invention may have other appearances than shown in the Figures.

The invention claimed is:

1. A plant for transmitting electric power through High Voltage Direct Current (HVDC) comprising:

two converter stations interconnected by a bipolar direct voltage network and respectively connected to two alternating voltage networks for feeding electric power from one of two said alternating voltage networks to the other of said two alternating voltage networks, each converter station having a respective voltage source converter having at least one phase leg connected to a first and second pole of a direct voltage side of the converter and comprising a series connection of switching cells, each said phase leg having a phase output configured to be connected to an alternating voltage side of the converter, the phase output being formed between two switching cells along said series connection of switching cells, each said switching cell having at least one energy storing capacitor, each said switching cell being configured to obtain a first switching state and a second switching state, for obtaining a determined alternating voltage on said phase output, wherein in the first switching state a voltage across said at least one energy storage capacitor is applied across two terminals of the switching cell, and in the second switching state, a zero voltage is applied across the two terminals of the switching cell, wherein said voltage source converters of the two converter stations are configured to utilize a direct voltage having a higher voltage magnitude for the first pole than for the second pole with respect to ground, and said voltage magnitude of said first pole is 5 to 20 times higher than said voltage magnitude of said second pole so as to be asymmetric with respect to ground for creating said alternating voltage on said phase output of the respective converter.

2. The plant according to claim 1, wherein said bipolar direct voltage network comprises one high voltage pole conductor configured to form said first pole interconnecting the two converter stations and one low voltage pole conductor configured to form said second pole interconnecting said converter stations.

3. The plant according to claim 1, wherein said bipolar direct voltage network comprises a line forming said two poles interconnecting said two converter stations, and said line has an inner central high voltage conductor forming said first pole and an outer low voltage conductor forming said second pole surrounding said high voltage conductor and being separated therefrom by an insulating layer.

4. The plant according to claim 3, wherein a cross-section area of said outer low voltage conductor is 1 to 2 times a cross-section area of the inner central high voltage conductor.

5. The plant according to claim 3, wherein said outer low voltage conductor is surrounded by an insulating layer.

6. The plant according to claim 1, wherein the number of the switching cells of said phase leg of the Voltage Source Converters is $\geq 4$, $\geq 12$, $\geq 30$ or $\geq 50$.

7. The plant according to claim 1, wherein semiconductor devices of the switching cell assemblies are IGBTs (Insulated Gate Bipolar Transistor), IGCTs (Integrated Gate Commutated Thyristor) or GTOs (Gate Turn-Off Thyristor).

8. The plant according to claim 1, wherein said voltage source converters of the two converter stations thereof are configured to have a direct voltage across said first pole and said second pole being between 1 kV and 1200 kV or between 10 kV and 1200 kV or between 100 kV and 1200 kV.

9. The plant according to claim 1, wherein the plant is configured to conduct a direct current of 200 A to 10 kA, or 1 kA to 7 kA, through said direct voltage network from one converter station to the other.

10. The plant according to claim 1, wherein the voltage magnitude of said first pole is 5 to 10 times higher than the voltage magnitude of said second pole.

11. The plant according to claim 3, wherein a cross-section area of said outer low voltage conductor is 1 to 1.5 times a cross-section area of the inner central high voltage conductor.

* * * * *